United States Patent
Nichele et al.

(10) Patent No.: US 9,276,814 B2
(45) Date of Patent: Mar. 1, 2016

(54) MIGRATION OF PROFILES BETWEEN VIRTUAL CONNECT DOMAINS

(75) Inventors: Caren Moraes Nichele, Porto Alegre Rio Grande Do Sul (BR); Michelle Catherine C Huang, Spring, TX (US); Julio Cesar Fernandes Correa, Porto Alegre (BR); Gabriel Girardello Detoni, Sunnyvale, CA (US); Edison Rafael Sa Dias, Porto Alegre Rio Grande Do Sul (BR)

(73) Assignee: Hewlett Packard Enterprise Development LP, Houston, TX (US)

( * ) Notice: Subject to any disclaimer, the term of this patent is extended or adjusted under 35 U.S.C. 154(b) by 920 days.

(21) Appl. No.: 13/408,544

(22) Filed: Feb. 29, 2012

(65) Prior Publication Data

US 2013/0227095 A1    Aug. 29, 2013

(51) Int. Cl.
- G06F 15/177 (2006.01)
- H04L 12/24 (2006.01)
- G06F 9/445 (2006.01)
- G06F 9/455 (2006.01)

(52) U.S. Cl.
CPC .......... *H04L 41/082* (2013.01); *G06F 9/44505* (2013.01); *H04L 41/0846* (2013.01); *H04L 41/0866* (2013.01); *G06F 9/45533* (2013.01)

(58) Field of Classification Search
CPC ............ H04L 29/12028; H04L 61/103; H04L 67/303
USPC ......................................................... 709/221
See application file for complete search history.

(56) References Cited

U.S. PATENT DOCUMENTS

| | | | | |
|---|---|---|---|---|
| 2008/0244060 A1* | 10/2008 | Cripe | ................ | H04L 29/12028 709/224 |
| 2008/0310421 A1* | 12/2008 | Teisberg | ............. | H04L 12/4641 370/395.53 |
| 2011/0023031 A1* | 1/2011 | Bonola | .................... | G06F 8/61 718/1 |

* cited by examiner

Primary Examiner — Arvin Eskandarnia
(74) Attorney, Agent, or Firm — Hewlett Packard Enterprise PatentDepartment

(57) ABSTRACT

Migration of profiles between virtual connect domains is described. In an example, a plurality of validations are performed on a profile from a first virtual connect domain virtualizing devices using a first configuration. The profile is updated based on a second virtual connect domain virtualizing devices using a second configuration. The profile is moved for use by a device in the second virtual connect domain.

10 Claims, 3 Drawing Sheets

MIGRATION OF PROFILES BETWEEN VIRTUAL CONNECT DOMAINS

BACKGROUND

Some computer systems include multiple enclosures contained, for example, within a rack. Each enclosure is capable of housing multiple computing devices such as servers (e.g., blade servers). In some such systems each server is operated according to a profile which defines such things as medium access control (MAC) addresses, World Wide Names (WWNs), Serial Number from what source the server is to boot, and the like. Operators of such systems generally cannot transfer or migrate the profiles between different enclosures containing different VC hardware or VC configuration. The inability to move profiles between enclosures can pose difficulties maintaining efficient usage of the computers and the applications that run thereon.

BRIEF DESCRIPTION OF THE DRAWINGS

Some embodiments of the invention are described with respect to the following figures.

DETAILED DESCRIPTION

Migration of profiles between virtual connect domains is described. Examples described herein can be used to migrate virtual connect (VC) serve profiles ("profiles") between virtual connect domains (VCDs) that have different logical configuration (ex: network/fabric names, network/fabric uplink ports, VC firmware version, etc) or hardware configurations (more generally referred to as different "configurations"). The profiles can be migrated to differently configured VCDs and keep the same profile identity. The connections and its virtual addresses in the migrated profiles are preserved to the extent possible, assuming the same networks and fabrics exist in the target VCDs. By providing for migration between VCDs of different logical/hardware configurations, customers can add new modules to their systems that provide new hardware configurations and features, while continuing to use their existing server profiles moving them to this updated system. This obviates the need to create new server profiles when new equipment is purchased, limits disruption to the customer's environment, and reduces migration times. Embodiments of the invention can be understood with reference to the following example implementations.

Figure 1:
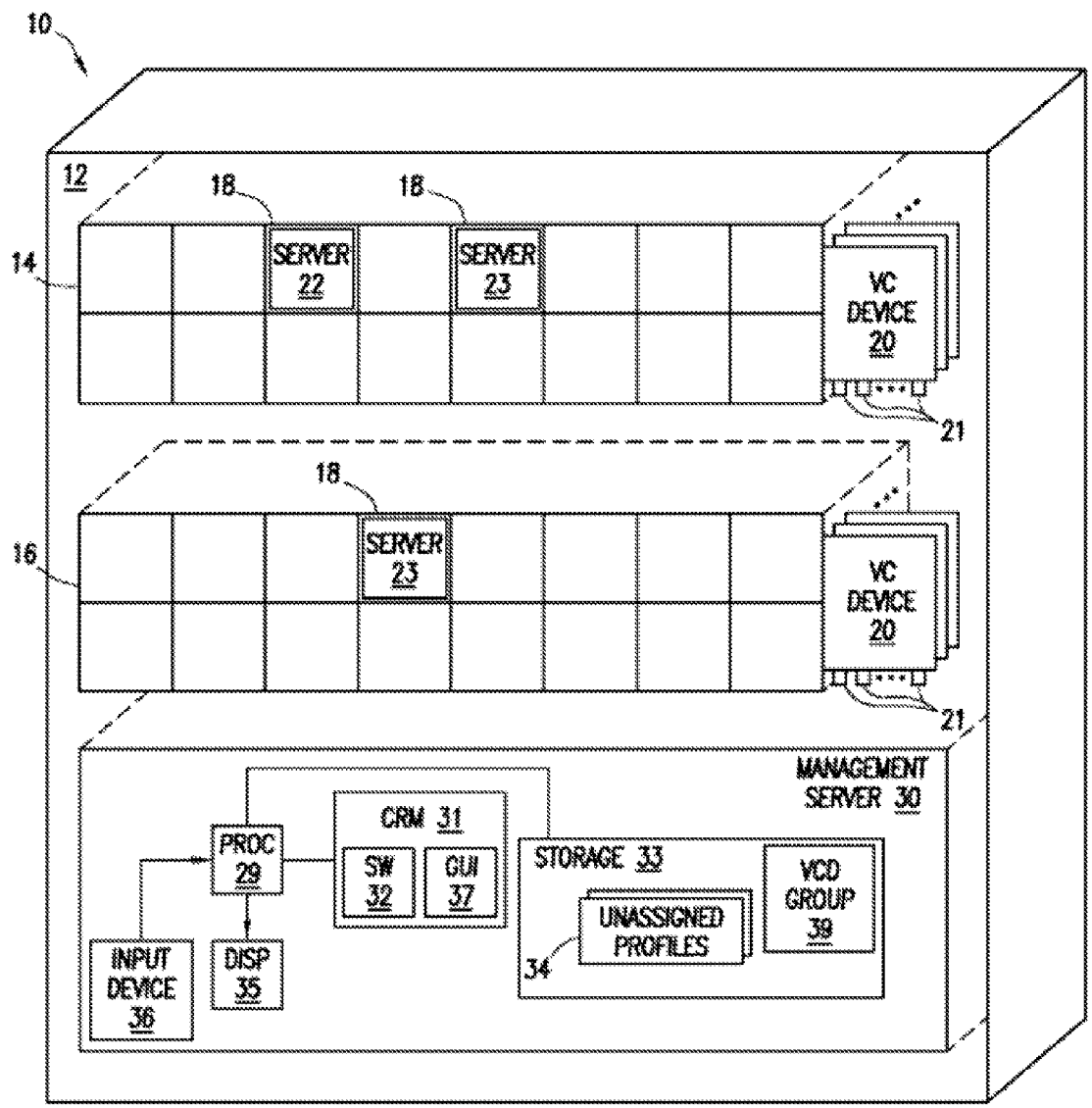
FIG. 1 is a block diagram of a system in accordance an example implementation.

FIG. 1 is a block diagram of a system 10 in accordance an example implementation. The system 10 includes an equipment rack 12 in which one or more enclosures 14, 16 can be installed. For purposes of this disclosure, at least one example of an equipment rack is any type of support structure that removably receives and houses one or more enclosures. Each enclosure can accommodate, for example, server computers (e.g., blade servers), storage devices, networking devices (e.g., hubs, routers, switches) or other types of computer network equipment. As shown in the example of FIG. 1, each enclosure 14, 16 can accommodate up to 16 servers. In other examples, an enclosure can accommodate a different number of servers. For sake of clarity, this disclosure refers to servers being housed in the enclosures 14, 16, but devices, as noted above, other than servers can be housed as well. The term "server" is representative of all such devices. Example servers 22, 23, and 24 are shown.

Each enclosure 14, 16 includes multiple bays 18 into which the servers 22-24 are installed. All bays 18 of a given enclosure can be populated with a server, but not all bays 18 need be populated with a server. Each enclosure 14, 16 is a mechanical housing that can be removed from the rack 12. Although two enclosures 14, 16 are shown installed in rack 12 in the example of FIG. 1, different numbers of enclosures can be installed as desired.

Each enclosure contains or is otherwise coupled to one or more virtual connect devices 20. In some examples, each VC device 20 is or includes an Ethernet module (e.g., an Ethernet switch) or a Fibre Channel (FC) module (e.g., an FC switch) or a FlexFabric module (e.g., an Ethernet and FC together in a single module). Each VC device 20 can include one or more ports 21 for connection to an external network. The VCDs 20 are programmable to route signals between select ports 21 and select servers in select bays 18.

Each virtual connect device 20 "virtualizes" the servers installed in the various bays 18 of the associated enclosure 14, 16. Virtualizing the servers includes implementing an abstraction layer between the servers and the external networks so that the external networks see a pool of servers rather than individual servers. Local area network (LAN) and storage area network (SAN) connections are made to the pool of servers in a given enclosures. An input/output "profile" is created for each server. Instead of using the hardware default media access control (MAC) addresses for all network interface controllers (NICs), hardware default World Wide Names (WWNs) for all host bus adapters (HBAs) and hardware default Serial Number, bay-specific I/O profiles can be created and unique MAC addresses, WWNs and Serial Number, can be assigned to such profiles. Thus, one or more of the bays in a given enclosure 14, 16 can be managed as a "virtual connect domain." All enclosures can be managed as virtual connect domains, but not all enclosures have to be so managed. Thus, one or more enclosures can be managed as virtual connect domains, while one or more other enclosures are not managed as virtual connect domains.

A profile not only specifies the server's MAC addresses, WWNs and Serial Number, but also the boot parameters (e.g., primary, secondary, use BIOS (basic input/output system) to boot, disabled). For the "primary" and "secondary" boot parameters, a WWPN (World Wide Port Number) and LUN (logical unit number) can be specified to permit the server to boot from a logical volume of a storage device.

Each server 22, 23, 24 that is part of a virtual connect domain operates according to a profile as described above. Each profile maps that server's MAC addresses and/or WWNs to MAC addresses/WWNs managed by the associated virtual connect device 20. The virtual connect devices 20 thus control communications to/from the various bays in the associated enclosure. In at least some examples, a profile is a data file. Each profile being used for a given server can be assigned to a particular bay of a particular enclosure. In some examples, all profiles assigned to the servers/bays in a given enclosure are stored in the virtual connect device 20 of that particular enclosure.

The system 10 of FIG. 1 also includes a management server 30, which communicatively couples to the virtual connect devices 20. The management server 30 can include a computer-readable medium 31 that contains software 32 executable by a processor 29. The computer-readable medium 31 comprises non-volatile storage (e.g., hard disk drive, compact disc read only memory), volatile storage (e.g., random access memory), or combinations thereof. The software 32, when executed by the processor 29, causes the management server 30 to perform one or more of the functions attributed to it in this disclosure. The management server 30 also includes, or is communicatively coupled to, a display 35 and an input device 36 (e.g., a keyboard, mouse, etc.). The management server 30 may be installed in the rack 12 (e.g., in an enclosure) or may be separate from the rack 12.

Figure 2:
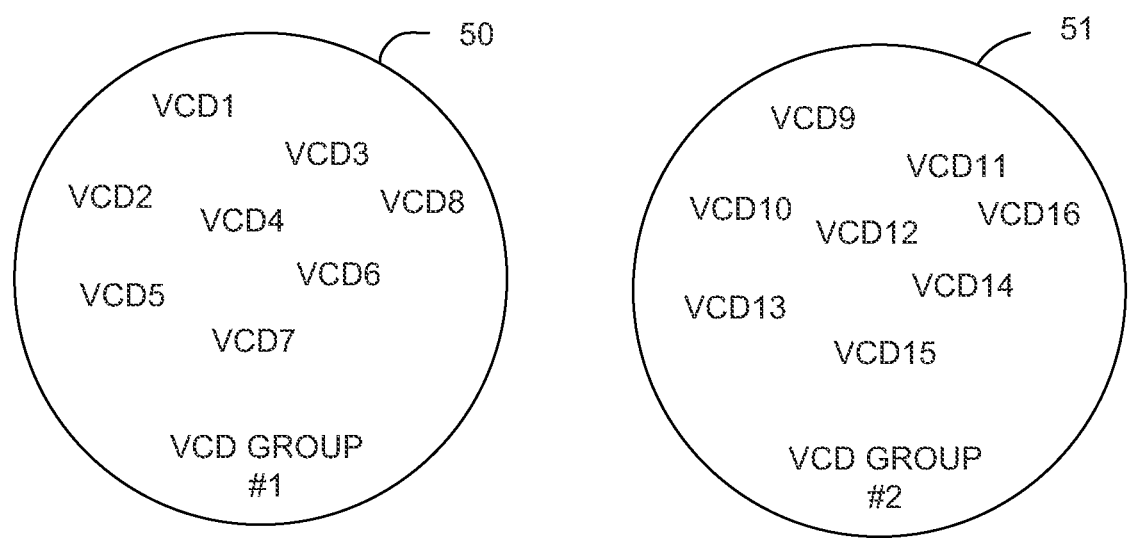
FIG. 2 illustrates relationships between multiple virtual connect domains (VCDs) and VCD Groups according to an example implementation.

As explained above, the various servers virtualized by a common virtual connect device 20 are part of a virtual connect domain (VCD) and that multiple VCDs can be present and operational. FIG. 2 illustrates relationships between multiple VCDs and VCD Groups according to an example implementation. Reference numeral 50 corresponds to a particular VCD Group #1 that contains eight VCDs designated as VCD1-VCD8. Reference number 51 corresponds to a particular VCD group #2 that contains eight VCDs designated as VCD9-VCD16.

In some examples, for VCDs to be members of a common VCD Group, all such VCDs must have the same connectivity, and the same hardware model and location (e.g., the same VC device model and I/O port location in the enclosure). Having the same connectivity means that the same ports on the VC device 20 are connected to the same external networks. Thus, if a particular VC device 20 in a given VCD has its port number 1 connected to a particular external network, then for another VCD to be a member of the same VCD Group, the same port number of the same VC device 20 of such other VCD must also be connected to the same external network. In some examples, the VC devices are identified by the location at which they are mated to the enclosures.

Referring again to FIG. 1, the management server 30 also includes storage 33 (volatile and/or non-volatile) for storing VCD Group information 39. Information about more than one VCD Group can be stored in storage 33. The information about each VCD Group includes at least the identity of the various VCDs that are members of that particular group. A user ensures that the connectivity among the various members of a particular group is, in fact, the same. The user programs VCD Group information 39 using, for example, input device 36, display 35, and software 32 working in concert with or containing a graphical user interface (GUI) 37. Via the GUI 37, the user can manage VCD groups and their constituent VCD members. The term "GUI" is meant to encompass graphical interfaces, command line interfaces (CLIs), and the like. Managing a VCD group includes, for example, creating the VCD group, adding VCD(s) to that group, removing a VCD from a particular group, synchronizing a VCD group, etc. In an example, managing VCD groups also includes migrating a server profile from one VCD to another, where the VCDs can be in different VCD groups and thus have different hardware configurations. The GUI 37 provides a user with selectable options to perform any of these management tasks.

Figure 3:
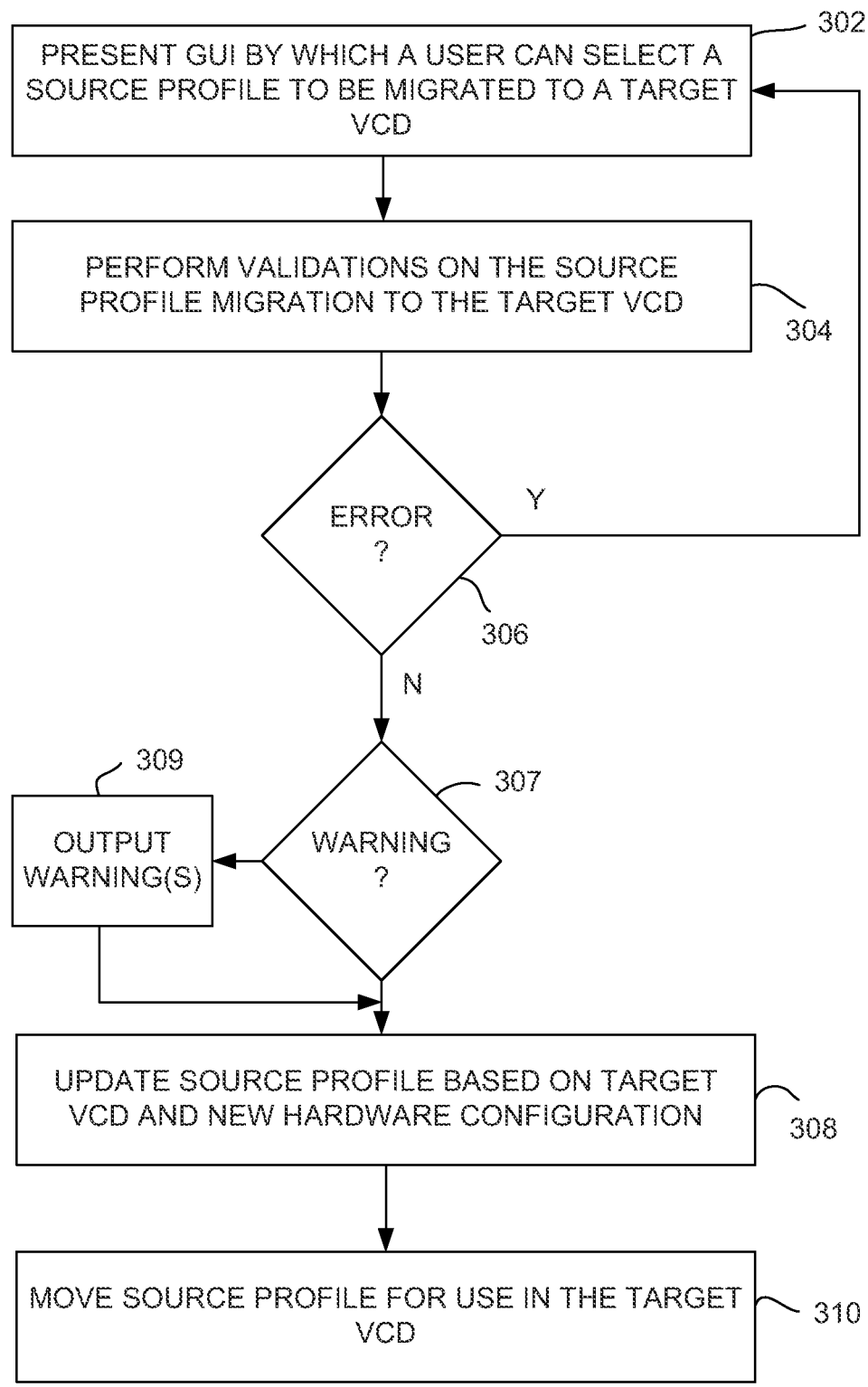
FIG. 3 is a flow diagram depicting a method of migrating a server profile between VCDs having different logical/hardware configurations according to an example implementation.

FIG. 3 is a flow diagram depicting a method 300 of migrating a server profile between VCDs having different logical or hardware configurations according to an example implementation. The method 300 can be performed by the management server 30. The method 300 can begin at step 302, where a graphical user interface is presented by which a user can select a source profile to be migrated and a target VCD. In an example, the source profile is associated with the hardware configuration of a source VCD in a source VCD group. The user can select a target VCD in a target VCD group that has a different logical/hardware configuration than the source VCD in the source VCD group. For example, the source and target VCD groups can have different virtual connect devices that provide different hardware configurations (e.g., in terms of model, I/O location, etc.).

At step 304, validations are performed on the source profile with respect to the migration to the target VCD. In general, the validations include comparing the requirements of the source profile to capabilities of the hardware configuration of the target VCD. The validations can be performed using a plurality of steps. In an example, a first step can include source resource validation related to movement of the source profile (e.g., server located at source bay must be powered off, valid source VCD status, etc.). A second step can include target resource validations related to movement of the source profile (e.g., server located at target bay must be powered off, target bay must have no profile assigned thereto, valid target VCD status, etc.).

A third step can include validations related to data exportation of features in use by the profile. In order for the source profile to be fully migrated, the target VCD must be able to support all of the features defined by the source profile. For example, the source profile may define various types of hardware connections, such as iSCSI, FC, FC over Ethernet (FCoE), and the like. Validations can be performed to check whether the target VCD supports such features.

A fourth step can include validations specifically related to network data exportation. For example, the target VCD must support virtual LAN (VLAN) mapping if the source profile uses multiple network connections; network names in use by the source profile should match the ones defined in the target VCD; network port speed defined in the source profile should be lower or equal to the maximum port speed defined for the matched network at the target VCD; and/or all VLAN network names in use by the source profile connection defined as "multiple networks" should match the network names in the target VCD. Such validations are merely examples and other validations related to network data can be employed in place of or in addition to any of the examples.

A fifth step can include validations specifically related to fabric data exportation. For example, fabric names and IO bays in use by FC/FCoE connections of the source profile should match fabric names and IO bays defined in the target VCD. The example validations described above in steps one through five are merely examples and other validations can be employed in place of or in addition to any of the examples in order to determine if the features of the source profile are supported by the target VCD.

At step 306, a determination can be made whether any of the validations have resulted in an error. The errors can be displayed to a user using the graphical user interface. If any of the validations result in an error, the method 300 can return to step 302. Otherwise, the method 300 can proceed to step 308.

At step 307, a determination can be made whether there are any warnings as a result of the validations. That is, a validation step may not generate an error, but does require a post-migration action from the user. Thus, a warning can be generated to inform the user of such post-migration action(s) generated as a result of the validation(s). If there are no warnings, the method 300 proceeds from step 307 to step 308. Otherwise, the method 300 proceeds to step 309, where the warning(s) are output. The method proceeds from step 309 to step 308.

At step 308, the source profile is updated based on the target VCD and the logical/hardware configuration thereof. In an example, a local copy of the source profile adapted for use in the target VCD can be created, leaving the original source profile intact. In case of error during the migration, the user can revert to using the original source profile in the source VCD.

At step 310, the source profile as updated is moved for use in the target VCD. In an example, "moving" the source profile includes deleting the source profile from the source VCD and using the source profile as updated to generate a new profile in the target VCD.

The methods described above may be embodied in a computer-readable medium for configuring a computing system to execute the method. The computer readable medium can be distributed across multiple physical devices (e.g., computers). The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc., just to name a few. Other new and various types of computer-readable media may be used to store machine readable code discussed herein.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method, comprising:
    performing plurality of validations on a profile from a first virtual connect domain virtualizing devices using a first configuration;
    updating the profile based on a second virtual connect domain virtualizing devices using a second configuration;
    determining whether any of the plurality of validations failed and, if so, presenting failure information associated with a failed validation; and
    moving the profile for use by a device in the second virtual connect domain if the plurality of validations passed;
    wherein performing a plurality of validations on a profile from a first virtual connect domain virtualizing devices using the first configuration comprises:
    determining whether the device is powered off and determining whether a target device of the moved profile in second virtual connect domain is powered off;
    determining whether the target device has no profile assigned thereto;
    determining whether the second virtual connect domain supports features defined by the profile, wherein the features include types of hardware connections; and
    determining whether the second virtual connect domain supports virtual local area network if the profile uses multiple network connections.

2. The method of claim 1, further comprising presenting a graphical user interface by which a user can select the profile and the second virtual connect domain.

3. The method of claim 2, wherein the failure information is presented on the graphical user interface.

4. The method of claim 1, wherein the plurality of validations include comparing the requirements of the profile to capabilities of the second configuration.

5. The method of claim 1, wherein the profile includes at least one of a media access control (MAC) address, a World Wide Name (WWN, or a Serial Number.

6. A non-transitory computer readable medium having stored thereon instructions that, when executed by a processor cause the processor to perform:
    performing plurality of validations on a profile from a first virtual connect domain virtualizing devices using a first configuration;
    updating the profile based on a second virtual connect domain virtualizing devices using a second configuration;
    determining whether any of the plurality of validations failed and, if so, presenting failure information associated with a failed validation; and
    moving the profile for use by a device in the second virtual connect domain if the plurality of validations passed;
    wherein performing a plurality of validations on a profile from the a first virtual connect domain virtualizing devices using the first configuration comprises:
    determining whether the device is powered off and determining whether a target device of the moved profile in second virtual connect domain is powered off;
    determining whether the target device has no profile assigned thereto;
    determining whether the second virtual connect domain supports features defined by the profile, wherein the features include types of hardware connections; and
    determining whether the second virtual connect domain supports virtual local area network if the profile uses multiple network connections.

7. The non-transitory computer readable medium of claim 6, wherein the processor is to further perform presenting a graphical user interface by which a user can select the profile and the second virtual connect domain.

8. The non-transitory computer readable medium of claim 7, wherein the failure information is presented on the graphical user interface.

9. The non-transitory computer readable medium of claim 6, wherein the plurality of validations include comparing the requirement of the profile to capabilities of the second configuration.

10. The non-transitory computer readable medium of claim 6, wherein the profile includes at least one of a media access control (MAC) address, a World Wide Name (WWN, or a Serial Number.

* * * * *

UNITED STATES PATENT AND TRADEMARK OFFICE
CERTIFICATE OF CORRECTION

PATENT NO. : 9,276,814 B2
APPLICATION NO. : 13/408544
DATED : March 1, 2016
INVENTOR(S) : Caren Moraes Nichele et al.

It is certified that error appears in the above-identified patent and that said Letters Patent is hereby corrected as shown below:

Claims

In column 5, line 37, in Claim 1, delete "performing" and insert -- performing a --, therefor.

In column 6, line 14, in Claim 5, delete "(WWN," and insert -- (WWN), --, therefor.

In column 6, line 18, in Claim 6, delete "performing" and insert -- performing a --, therefor.

In column 6, line 30, in Claim 6, delete "the a" and insert -- a --, therefor.

In column 6, line 56, in Claim 10, delete "(WWN," and insert -- (WWN), --, therefor.

Signed and Sealed this
Nineteenth Day of July, 2016

Michelle K. Lee
*Director of the United States Patent and Trademark Office*